United States Patent
Kobori et al.

(10) Patent No.: US 10,611,027 B2
(45) Date of Patent: Apr. 7, 2020

(54) ASSEMBLY APPARATUS AND CONTROL METHOD THEREFOR

(71) Applicant: Sony Corporation, Tokyo (JP)

(72) Inventors: Yuji Kobori, Chiba (JP); Makoto Tonegawa, Chiba (JP); Hideki Takayanagi, Chiba (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 15/780,863

(22) PCT Filed: Nov. 29, 2016

(86) PCT No.: PCT/JP2016/005001
§ 371 (c)(1),
(2) Date: Jun. 1, 2018

(87) PCT Pub. No.: WO2017/098699
PCT Pub. Date: Jun. 15, 2017

(65) Prior Publication Data
US 2018/0272533 A1 Sep. 27, 2018

(30) Foreign Application Priority Data
Dec. 10, 2015 (JP) ................................ 2015-241069

(51) Int. Cl.
*B25J 9/16* (2006.01)
*B23P 21/00* (2006.01)
(Continued)

(52) U.S. Cl.
CPC .......... *B25J 9/1664* (2013.01); *B23P 21/006* (2013.01); *B25J 9/0084* (2013.01); *B25J 13/00* (2013.01);
(Continued)

(58) Field of Classification Search
None
See application file for complete search history.

(56) References Cited

U.S. PATENT DOCUMENTS 4,611,749 A * 9/1986 Kawano ............... B23K 37/047
228/176
4,890,241 A * 12/1989 Hoffman ............... B25J 9/1676
700/255

(Continued)

FOREIGN PATENT DOCUMENTS

JP 58-150436 A 10/1983
JP 59-73246 A 4/1984
(Continued)

OTHER PUBLICATIONS

Written Opinion and English translation thereof dated Mar. 7, 2017 in connection with International Application No. PCT/JP2016/005001.
(Continued)

*Primary Examiner* — Ramesh B Patel
(74) *Attorney, Agent, or Firm* — Wolf, Greenfield & Sacks, P.C.

(57) ABSTRACT

An assembly apparatus according to an embodiment of the present technology includes a work base, a first robot, a second robot, and a controller. The work base has a placement surface on which a plurality of works is placed and causes the plurality of works to individually circulate to a plurality of work areas arranged along a circumference every certain time. The first robot is disposed inside the circumference and capable of accessing the plurality of work areas. The second robot is disposed outside the circumference and capable of accessing at least one work area out of the plurality of work areas. The controller causes the first robot to perform a predetermined process within the certain time with respect to works on a plurality of predetermined
(Continued)

work areas out of the plurality of work areas, and causes the second robot to perform an operation of assisting the process by the first robot with respect to the work on the at least one work area out of the plurality of predetermined work areas.

10 Claims, 8 Drawing Sheets

(51) Int. Cl.
   *G05B 19/402* (2006.01)
   *B25J 13/00* (2006.01)
   *B25J 9/00* (2006.01)

(52) U.S. Cl.
   CPC .. *G05B 19/402* (2013.01); *G05B 2219/40409* (2013.01); *Y10S 901/08* (2013.01)

(56) References Cited

U.S. PATENT DOCUMENTS

| | | | | |
|---|---|---|---|---|
| 4,928,383 | A * | 5/1990 | Kaczmarek | B23P 21/004 29/711 |
| 4,984,349 | A * | 1/1991 | Ohta | B23Q 7/1436 191/8 |
| 4,998,050 | A * | 3/1991 | Nishiyama | B25J 9/1666 318/567 |
| 5,010,634 | A * | 4/1991 | Uemura | B62D 65/02 29/407.04 |
| 5,272,805 | A * | 12/1993 | Akeel | B23K 37/047 29/712 |
| 5,341,304 | A * | 8/1994 | Sakamoto | B62D 65/005 700/110 |
| 8,157,155 | B2 * | 4/2012 | Diez | B23K 11/11 228/44.3 |
| 10,279,468 | B2 * | 5/2019 | Kobori | B25J 9/0009 |
| 2011/0185556 | A1 * | 8/2011 | Hirano | B25J 9/0084 29/428 |
| 2012/0217129 | A1 * | 8/2012 | Tsutsumi | B23P 21/004 198/341.07 |
| 2013/0245823 | A1 * | 9/2013 | Kimura | B25J 5/02 700/248 |
| 2016/0101527 | A1 * | 4/2016 | Kobori | B25J 15/0293 294/81.62 |
| 2017/0008165 | A1 * | 1/2017 | Kobori | B25J 9/0009 |
| 2017/0212508 | A1 * | 7/2017 | Kobori | B23P 19/04 |
| 2018/0326580 | A1 * | 11/2018 | Wessen | B25J 9/1605 |

FOREIGN PATENT DOCUMENTS

| | | |
|---|---|---|
| JP | 59-110523 A | 6/1984 |
| JP | 60-29285 A | 2/1985 |
| JP | 5-138465 A | 6/1993 |
| JP | 6-226568 A | 8/1994 |
| JP | 2010-234456 A | 10/2010 |
| JP | 5682721 B1 | 3/2015 |
| WO | WO 2009/098285 A1 | 8/2009 |

OTHER PUBLICATIONS

International Preliminary Report on Patentability and English translation thereof dated Jun. 21, 2018 in connection with International Application No. PCT/JP2016/005001.

International Search Report and English translation thereof dated Mar. 7, 2017 in connection with International Application No. PCT/JP2016/005001.

* cited by examiner

ASSEMBLY APPARATUS AND CONTROL METHOD THEREFOR

CROSS-REFERENCE TO RELATED APPLICATIONS

This application claims the benefit under 35 U.S.C. § 371 as a U.S. National Stage Entry of International Application No. PCT/JP2016/005001, filed in the Japanese Patent Office as a Receiving Office on Nov. 29, 2016, which claims priority to Japanese Patent Application Number JP2015-241069, filed in the Japanese Patent Office on Dec. 10, 2015, each of which is hereby incorporated by reference in its entirety.

TECHNICAL FIELD

The present technology relates to an assembly apparatus provided with a plurality of robots used to assembly an electronic apparatus or the like and a control method therefor.

BACKGROUND ART

For example, in work assembly and conveyance processes in a manufacturing line for electronic apparatuses or electronic components, various industrial robot apparatuses are used. For the industrial robot apparatuses of this kind, for example, an enhancement of an operation efficiency is being demanded.

For example, Patent Literature 1 discloses a component supply apparatus provided with an installation member around which work areas are provided, an automatic assembly apparatus provided in a center of the installation member, and a self-running carriage that assists in carrying and removing a work in and from the installation member. As a result, a series of processes from the assembly to the removing of the work can be separately performed by the automatic assembly apparatus and the self-running carriage, which can enhance an operation efficiency.

CITATION LIST

Patent Literature

Patent Literature 1: Japanese Patent Application Laid-open No. Sho 59-73246

DISCLOSURE OF INVENTION

Technical Problem

However, in the technology disclosed in Patent Literature 1, a whole assembly process for the work is performed by the automatic assembly apparatus, so a time required to assembly the work depends on a working capability of the automatic assembly apparatus. For this reason, there is a limit on a reduction in time for an entire working from the assembly to conveyance of the work. In manufacturing electronic apparatuses or electronic components, there is a problem in that a further enhancement of productivity is difficult.

In view of the circumstances as described above, an object of the present technology is to provide an assembly apparatus capable of increasing productivity and a control method for the assembly apparatus.

Solution to Problem

To achieve the above object, an assembly apparatus according to an embodiment of the present technology includes a work base, a first robot, a second robot, and a controller.

The work base has a placement surface on which a plurality of works is placed, and causes the plurality of works to individually circulate to a plurality of work areas arranged along a circumference every certain time.

The first robot is disposed inside the circumference and capable of accessing the plurality of work areas.

The second robot is disposed outside the circumference and capable of accessing at least one work area out of the plurality of work areas.

The controller causes the first robot to perform a predetermined process within the certain time with respect to works on a plurality of predetermined work areas out of the plurality of work areas, and causes the second robot to perform an operation of assisting the process by the first robot with respect to the work on the at least one work area out of the plurality of predetermined work areas.

In the assembly apparatus, the assembly working for the work by the first robot is assisted by the second robot. As a result, a cycle time of an entire apparatus does not depend on the assembly working that requires a long cycle time by the first robot, with the result that the cycle time of the entire apparatus can be reduced as compared to a technology in related art. Thus, according to the present technology, it is possible to provide the assembly apparatus capable of achieving a further enhancement of productivity in manufacturing electronic apparatuses or electronic components.

The assembly apparatus may further include a component storage unit that stores a first component, in which the plurality of predetermined work areas may include a first assembly area in which the first component is assembled to the work, and the controller may cause the second robot to perform an operation of conveying the first component from the component storage unit to a relay position set between the first robot and the component storage unit, and cause the first robot to perform an operation of obtaining the first component conveyed to the relay position and assembling the first component to the work in the first assembly area.

As a result, the first robot does not have to obtain the first component from the component storage unit, and therefore a time required to obtain the first component by the first robot is reduced. Thus, work efficiency of the first robot is improved, and a further reduction of a time required to assembly the work can be achieved.

The assembly apparatus may further include a component support base disposed on the relay position and capable of supporting the first component.

As a result, the second robot can indirectly pass the first component to the first robot through the component support base. Thus, the second robot does not have to stand by until the second robot passes the first component to the first robot, with the result that hit is possible to enhance work efficiency of the second robot.

The plurality of predetermined work areas may include a second assembly area in which a second component is assembled to the work, and the controller may cause the second robot to perform an operation of assembling the second component to the work in the second assembly area.

As a result, when the second robot is assembling the second component to the work in the second assembly area, the first robot can perform a predetermined assembly working in a work area different from the second assembly area in parallel. Thus, productivity until the work is assembled is enhanced.

The controller may determine whether the predetermined process by the first robot with respect to the works on the plurality of predetermined work areas is capable of being carried out within the certain time or not, and when determines that the predetermined process is not capable of being carried out, the controller may cause the second robot to perform the predetermined process on behalf of the first robot.

As a result, even if the predetermined process by the first robot with respect to each work in the plurality of predetermined work areas cannot be carried out within the certain time, a subsequent assembly working that is to be performed by the first robot is performed by the second robot, and the assembly working for the work is shared by the first and second robots. Thus, the cycle time until the work W is assembled is within a target cycle time, with the result that an increase in cycle time of the entire apparatus is suppressed.

The assembly apparatus may further include an assistance apparatus that is disposed outside the circumference and performs a predetermined process with respect to the work on a work area different from the plurality of predetermined work areas within the certain time.

As a result, the assembly working for the work is shared by the first and second robots and the assistance apparatus, and thus a time until the work is assembled is reduced, thereby enhancing the productivity.

The work base may be composed of a rotation table rotated by a predetermined angle every certain time, and the first robot may be disposed on a center portion of the rotation table in non-contact with the rotation table.

As a result, an occurrence of vibrations of the rotation table due to contact with the first robot is prevented, and predetermined process can be reliably performed with respect to each work on the plurality of work areas.

The assembly apparatus may further include a mounting unit having a first mounting that supports the first robot and a second mounting independent of the first mounting.

In the mounting unit of the present technology, the first mounting and the second mounting are integrated through the connection frame. Therefore, for example, at a time of starting the apparatus or at a time of changing a layout of a line, it is possible to secure desired accuracy of installation for the mountings. As a result, as compared to a case where the two mountings are separated, it is possible to enhance workability of installation of the mounting unit.

To achieve the object described above, an assembly apparatus according to another embodiment of the present technology includes a work base, a first robot, a second robot, and a controller.

The work base has a placement surface on which a plurality of works is placed, and causes the plurality of works to individually circulate to a plurality of work areas arranged along a circumference every certain time.

The first robot is disposed inside the circumference and capable of accessing the plurality of work areas.

The second robot is disposed outside the circumference and capable of accessing at least one work area out of the plurality of work areas.

The controller causes the first robot and the second robot to perform a predetermined process within the certain time with respect to works on a plurality of predetermined work areas out of the plurality of work areas.

As a result, the assembly working for the work is shared by the first and second robots. Thus, the cycle time until the work W is assembled can be reduced as compared to a technology in related art, and therefore a further enhancement of productivity can be achieved.

To achieve the object described above, a control method for an assembly apparatus according to another embodiment of the present technology includes:

causing a plurality of works to individually circulate to a plurality of work areas arranged along a circumference every certain time;

causing a first robot disposed inside the circumference to perform a predetermined process within the certain time with respect to works on a plurality of predetermined work areas out of the plurality of work areas; and causing a second robot disposed outside the circumference to perform an operation of assisting the process by the first robot with respect to the work on at least one work area out of the plurality of predetermined work areas.

Advantageous Effects of Invention

As described above, according to the present technology, it is possible to provide the assembly apparatus and the control method for the assembly apparatus which can enhance the productivity. It should be noted that the effects described herein are not necessarily limited. Any effect described in this disclosure may be obtained.

MODE(S) FOR CARRYING OUT THE INVENTION

Hereinafter, embodiments of the present technology will be described with reference to the drawings.

First Embodiment

Figure 1:
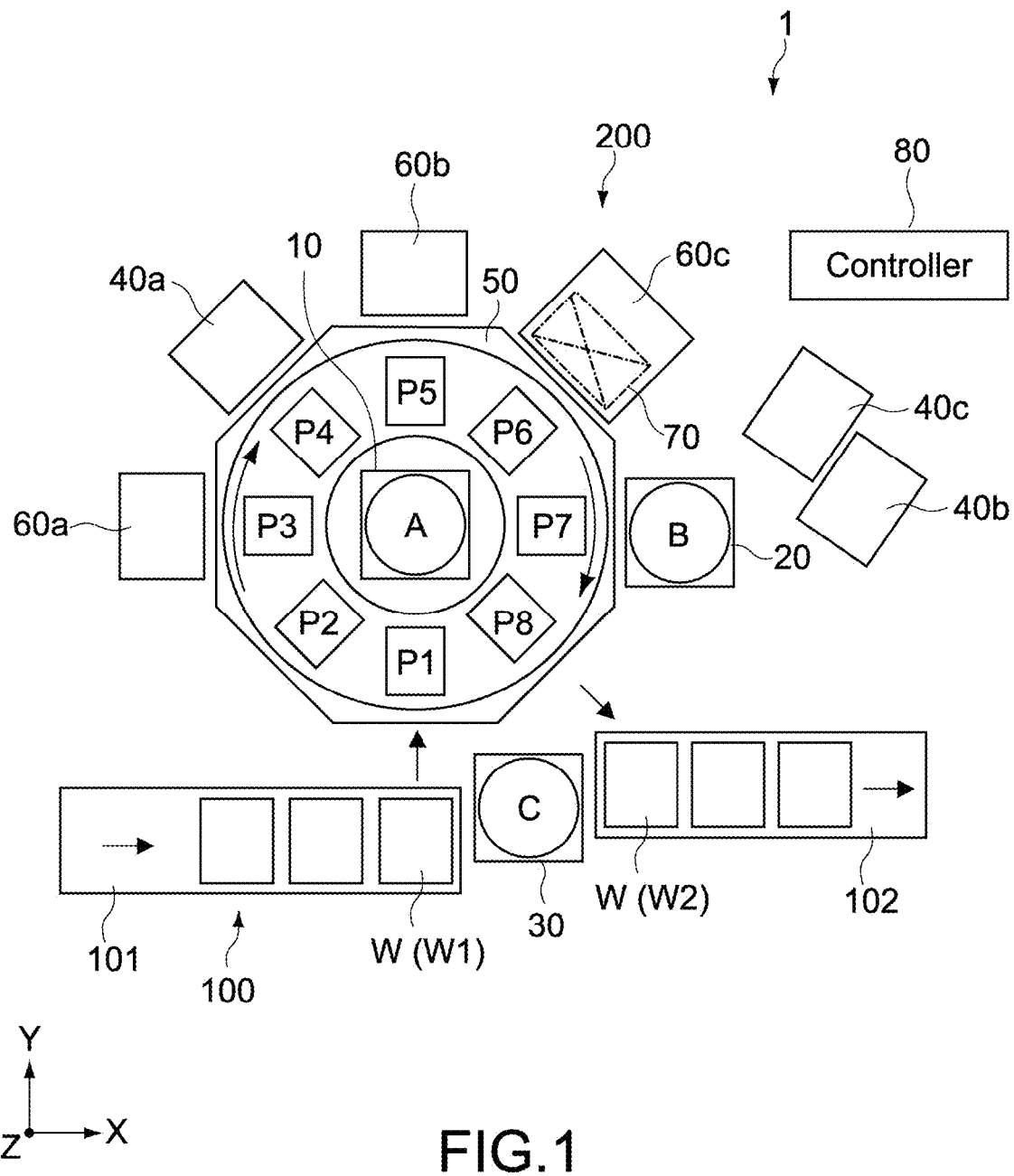
FIG. 1 A schematic plan view showing a configuration of a production system according to an embodiment of the present technology.

FIG. 1 is a schematic plan view showing a configuration of a production system 1 according to an embodiment of the present technology. It should be noted that in the figure, an X axis, a Y axis, and a Z axis indicate three axis directions orthogonal to one another. The X axis and the Y axis correspond to a horizontal direction, and the Z axis corresponds to a height direction (the same holds true for the following figures).

<<Outline of Production System>>

In this embodiment, as shown in FIG. 1, the production system 1 includes a conveyance line 100 that conveys a work W and an assembly apparatus 200.

<Conveyance Line>

The conveyance line 100 includes a first conveyor 101 that conveys a work W (W1) before assembly and a second conveyor 102 that conveys a work W (W2) after assembly. The first conveyor 101 and the second conveyor 102 are constituted of linear conveyors that linearly convey the works W1 and W2, respectively, in an X axis direction, but are not limited to those. At least one of the first conveyor 101 and the second conveyor 102 may be constituted of a conveyor capable of conveying the work in a curved manner.

(About Work)

Figure 2:
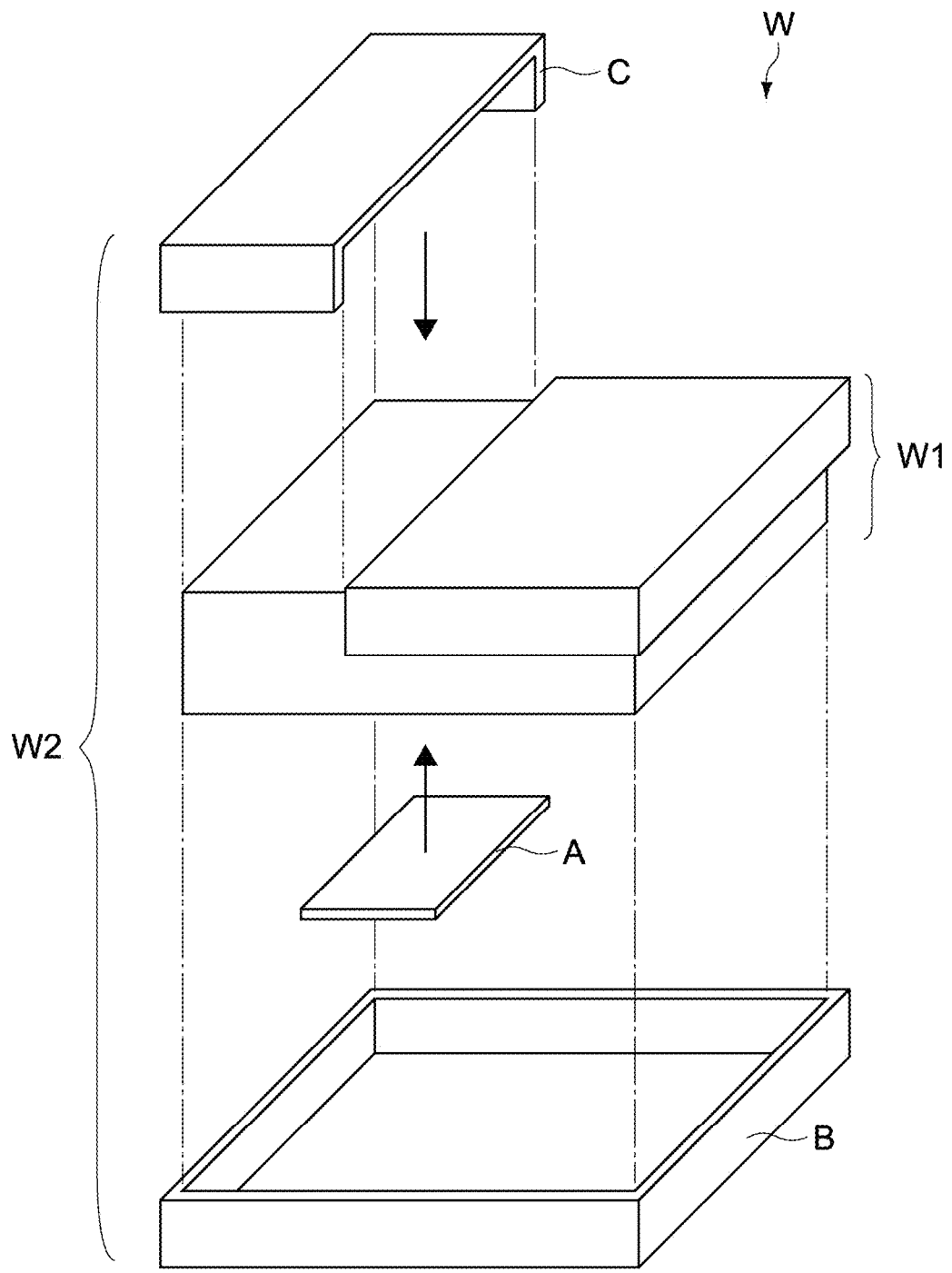
FIG. 2 An exploded perspective view showing a main portion of a work.

FIG. 2 is an exploded perspective view showing a main portion of the work W. As shown in FIG. 2, the work W includes the work W1 before assembly and components A to C to be assembled to the work W1. Here, as shown in FIG. 2, the production system 1 is configured to assembly the components A to C sequentially to an apparatus main body (work) W1 which is in a semi-completion state and manufacture and convey the work W2.

The work W is not particularly limited. Examples thereof include an electric or electronic component, a mechanical component, a product or a unit apparatus composed of an assembly of those components, and the like. Specifically, an electronic apparatus on which an optical disc drive or the like is mounted is used therefor. Further, in this embodiment, the component A is a shield member made of metal, and the component B and the component C are cover members made of plastic. However, those components are not limited thereto.

Further, in this embodiment, the work W is placed in a lying posture in such a manner that a side of the work W to which the component A and the component B are attached corresponds to a vertically upper side on the conveyance line 100 and is conveyed to a work base 50 with the posture maintained. It should be noted that the posture of the work W is not limited to this. A setting thereof can be changed as appropriate in accordance with configurations of the conveyance line 100 and the assembly apparatus 200.

<Assembly Apparatus>

Subsequently, the configuration of the assembly apparatus 200 will be described. As shown in FIG. 1, the assembly apparatus 200 includes the work base 50, a first robot 10 as a first robot (A), a second robot 20 as the second robot (B), and a controller 80.

[Work Base]

Figure 3:
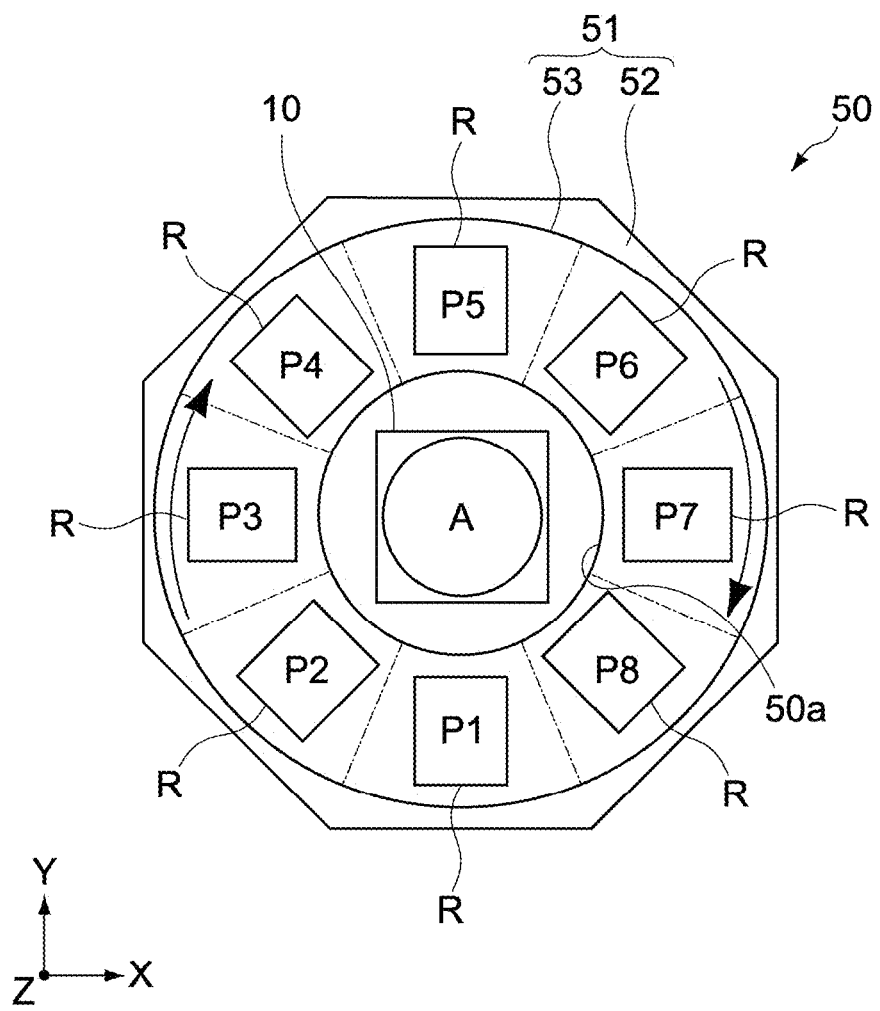
FIG. 3 A schematic plan view showing a main portion of an assembly apparatus according to an embodiment of the present technology.

FIG. 3 is a schematic plan view showing a main portion of the assembly apparatus 200. The work base 50 according to this embodiment is provided with a work table 51. As shown in the figure, the work table 51 includes a fixed table unit 52 and a rotation table unit 53 provided in an inner circumferential area of the fixed table unit 52.

As shown in FIG. 3, the rotation table unit 53 includes a plurality of work areas P1 to P8 arranged along a circumference at equiangular intervals. The work W is sequentially conveyed to the plurality of work areas P1 to P8 on the rotation table unit 53. Then, in the work areas P1 to P8, predetermined workings set in advance, for example, an attachment or assembly of the component, a conversion of the posture, and the like are performed. As will be described later, the work W is conveyed from the conveyance line 100 (first conveyor 101) to the work area P1 and returned to the conveyance line 100 (second conveyor 102) again through the work areas P2 to P8.

The rotation table unit 53 is constituted of an index table capable of intermittently rotating around the Z axis (FIG. 1) at a predetermined angle pitch in a placement plane. In this embodiment, the rotation table unit 53 includes a plurality of reception bases R capable of supporting the works W. The plurality of reception bases R is provided in the work areas, respectively, at equiangular intervals as shown in FIG. 3. As a result, eight works W are disposed equiangularly (intervals of 45 degrees) on the reception bases R. Thus, the rotation table unit 53 is rotated in a certain direction (for example, clockwise in FIG. 3) at a 45-degree pitch.

Further, the rotation table unit 53 is rotated at a 45-degree pitch every predetermined time. The predetermined time is set to be a time during which a predetermined process including carrying and removing of the works W (W1, W2) can be performed on each rotation position of the rotation table unit 53. Typically, the predetermined time is set with a longest time required to perform a process in workings performed in the work areas as a reference.

That is, the rotation table unit 53 according to this embodiment is configured in such a manner that the works W conveyed to the work area P1 are circulated from the work areas P1 to P8 individually every certain time. It should be noted that the certain time is an intermittent rotation period (time during which the rotation table unit 53 is still) of the rotation table unit 53 and is referred to as "time T1" in the following description.

Further, as shown in FIG. 3, on a center portion of the rotation table unit 53, an opening portion 50a for providing the first robot 10 is formed, and a certain gap is formed between the opening portion 50a and the first robot 10. As a result, the first robot 10 is disposed in non-contact with the rotation table unit 53 (opening portion 50a), so an occurrence of vibrations of the work table 51 due to contact with the first robot 10 is prevented. It should be noted that the shape of the rotation table unit 53 according to this embodiment is a circular shape as shown in FIG. 3 but is not limited to this. The shape may be an arbitrary shape such as a rectangular shape.

(Mounting Unit)

Figure 4:
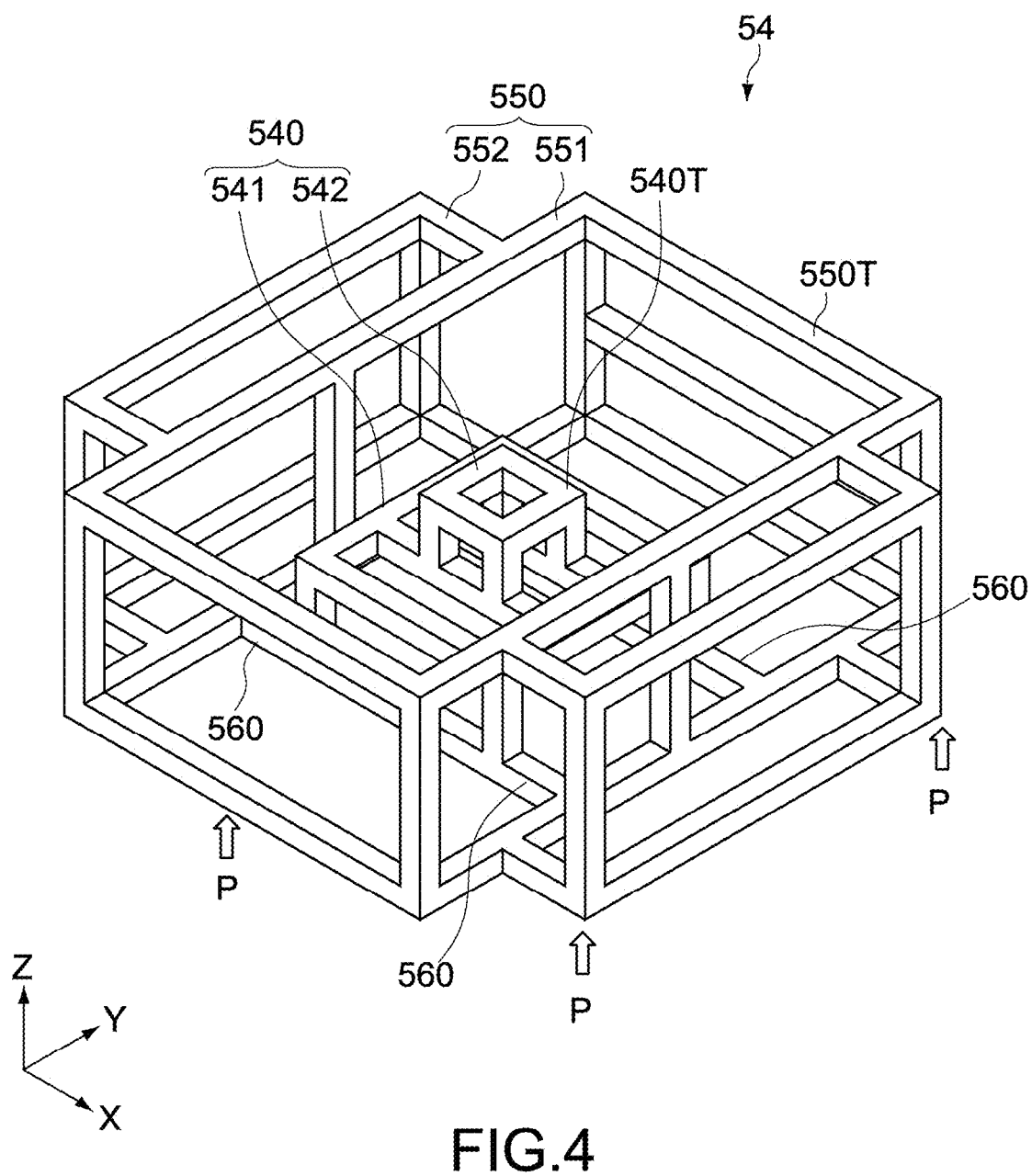
FIG. 4 A schematic perspective view showing a main portion of a work base of the assembly apparatus.
Figure 5:
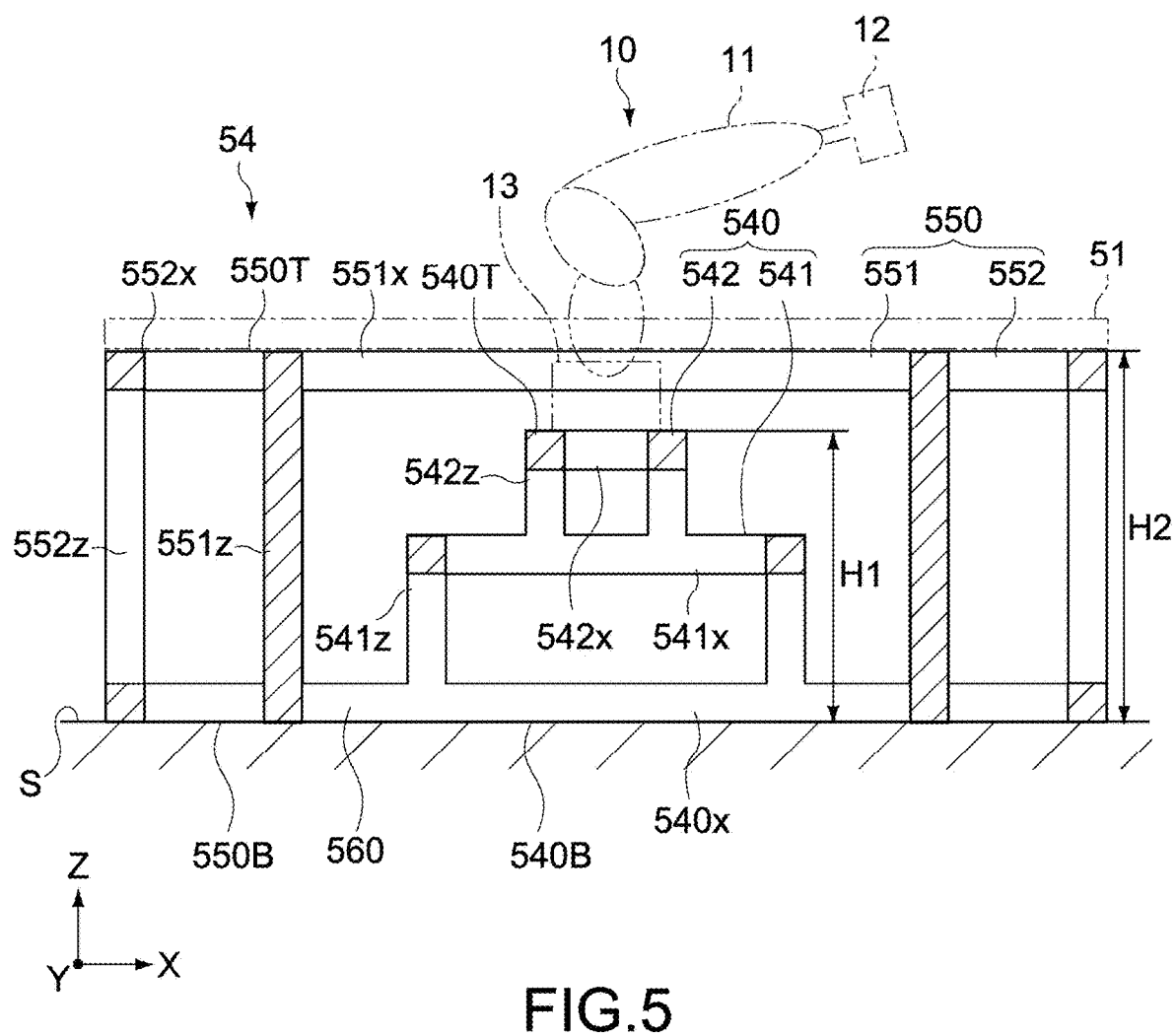
FIG. 5 A cross-sectional view showing the main portion when the work base is viewed from a front surface.
Figure 6:
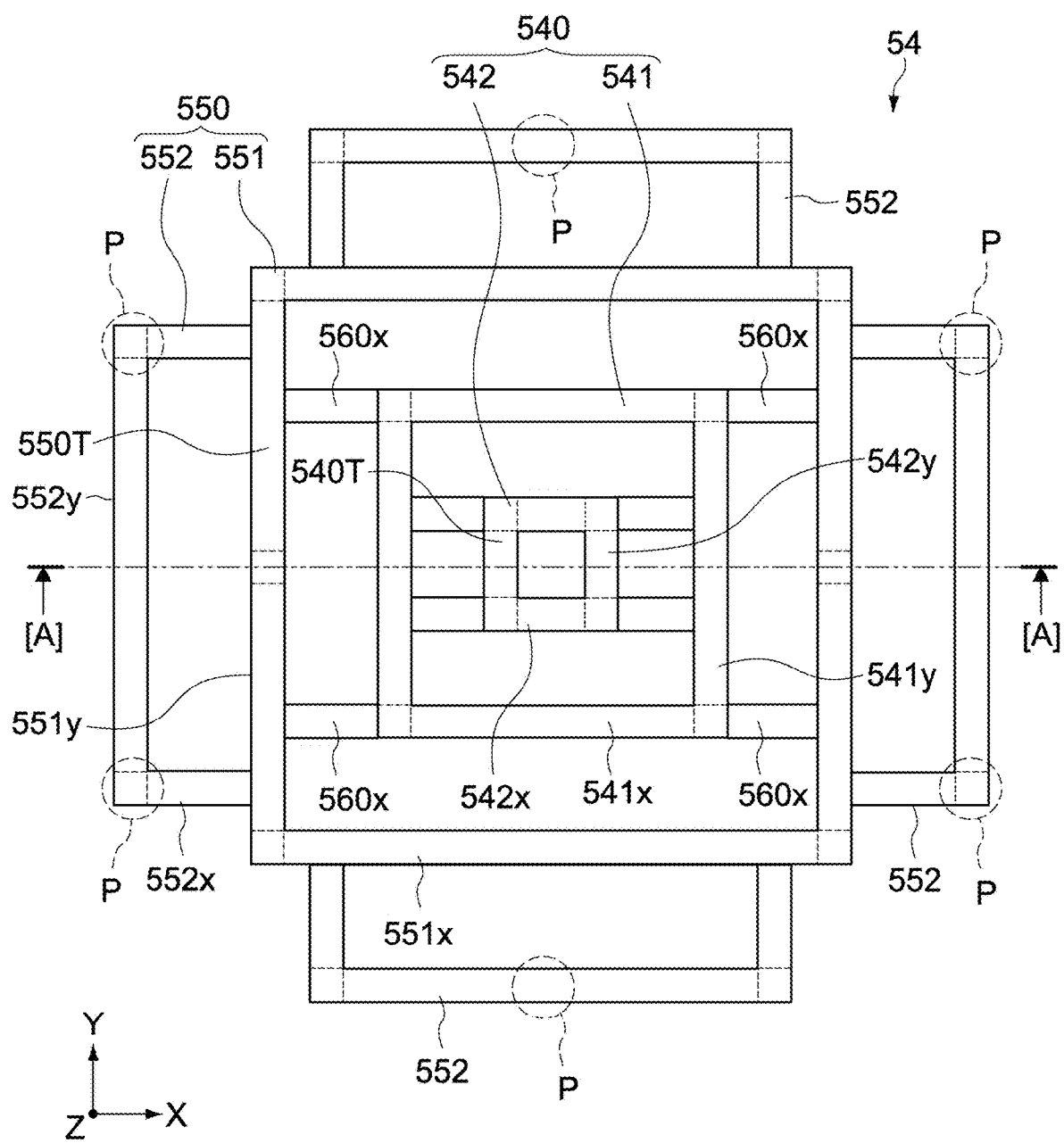
FIG. 6 A plan view showing the main portion of the work base.

FIG. 4 is a schematic perspective view showing a main portion of the work base 50, and FIG. 5 is a cross-sectional view (cross-sectional view taken along a line [A]-[A] of FIG. 6) of the main portion when the work base 50 is viewed from a front surface. Further, FIG. 6 is a plan view of the main portion of the work base 50. In the figures, the X axis and Y axis directions indicate horizontal directions orthogonal to each other, and the Z axis indicates a height direction orthogonal to the X and Y axis directions.

As shown in FIG. 5, the work base 50 according to this embodiment includes a mounting unit 54 that supports the work table 51 and the first robot 10. As shown in FIG. 4, the mounting unit 54 is constituted of a three-dimensional frame body that is made of metal and has a framework. Further, the mounting unit 54 is set to have a height in such a manner that the first robot 10 and the work table 51 can be provided on positions at predetermined heights of H1 and H2 from a floor surface S shown in FIG. 5.

Further, as shown in FIG. 4 to FIG. 6, the mounting unit 54 includes a first mounting 540, a second mounting 550, and a connection frame 560.

(First Mounting)

The first mounting 540 is constituted of a three-dimensional frame body made of metal. The first mounting 540 includes a first upper end portion 540T that supports the first robot 10 and a first bottom portion 540B that is provided on the floor surface S.

The first mounting 540 further includes a combination structure of a first base frame 541 and a second base frame 542.

The first base frame 541 has a framework including the first bottom portion 540B. That is, the first base frame 541 includes a plurality of shaft members 541x that is extended in the X axis direction, a plurality of shaft members 541y that is extended in the Y axis direction, and a plurality of shaft members 541z that is extended in the Z axis direction, and is constituted of the frame body having a three-dimensional structure in which the plurality of shaft members are mutually combined. The first bottom portion 540B is constituted of a frame surface parallel with the floor surface S.

The second base frame 542 has a framework including the first upper end portion 540T. That is, the second base frame 542 includes a plurality of shaft members 542x that is extended in the X axis direction, a plurality of shaft members 542y that is extended in the Y axis direction, and a plurality of shaft members 542z that is extended in the Z axis direction, and is constituted of the frame body having a three-dimensional structure in which the plurality of shaft members are mutually combined. The first upper end portion 540T is constituted of a frame surface parallel with the floor surface S.

The pluralities of shaft members 542x, 542y, and 542z that constitute the second base frame 542 each have shorter shaft lengths that the pluralities of shaft members 541x, 541y, and 541z that constitute the first base frame 541. The second base frame 542 configured as described above is disposed on an upper center of the first base frame 541.

The first base frame 541 and the second base frame 542 are combined or integrated by bolting or welding the plurality of shaft members, for example. Lengths, cross-sectional shapes, thicknesses, and the like of the shaft members are not particularly limited. Designing is performed in such a manner that predetermined rigidity and strength can be obtained so as to stably support the first robot 10.

In this embodiment, the second base frame 542 is attachable to and detachable from the first base frame 541. In this case, the second base frame 542 is detached with the first robot 10 from the first base frame 541. As a result, in accordance with a kind of the first robot 10, a configuration of the second base frame 542 can be optimized.

(Second Mounting)

The second mounting 550 is configured by a three-dimensional metal frame body like the first mounting 540. The second mounting 550 includes a second upper end portion 550T that supports the work table 51 and a second bottom portion 550B provided on the floor surface S.

The second mounting 550 has a framework including the second bottom portion 550B and the second upper end portion 550T and surrounds the first mounting 540. The second bottom portion 550B and the second upper end portion 550T are configured by frame surfaces respectively parallel to the floor surface S. In this embodiment, the second mounting 550 includes a main body frame portion 551 and a plurality of auxiliary frame portions 552.

A main body frame portion 421 includes a plurality of shaft members 421x that is extended in the X axis direction, a plurality of shaft members 421y that is extended in the Y axis direction, and a plurality of shaft members 421z that is extended in the Z axis direction, and is configured by a frame body having a rectangular parallelepiped shape in which the plurality of shaft members are combined with each other.

The plurality of shaft members 551x, 551y, and 551z that constitute the main body frame portion 551 have longer shaft lengths than the plurality of shaft members 541x, 541y, and 541z that constitute the first base frame 541. In this embodiment, the shaft member 551z along the Z axis direction has a longer shaft length than a sum of those of the shaft member 541z of the first base frame 541 and the shaft member 542z of the second base frame 542.

A plurality of auxiliary frame portions 422 is respectively provided on four side surfaces of the main body frame portion 421. The auxiliary frame portions 422 include a plurality of shaft members 422x that is extended in the X axis direction, a plurality of shaft members 422y that is extended in the Y axis direction, and a plurality of shaft members that is extended in the Z axis direction, and is configured by a frame body having a rectangular parallelepiped shape in which the plurality of shaft members are combined with each other.

Upper surfaces of the auxiliary frame portions 552 and the main body frame portion 551 are flush with each other. As a result, the second upper end portion 550T is formed. On appropriate positions of the second upper end portion 550T, a plurality of bolting holes for fastening the work table 51 is formed.

On the other hand, lower surfaces of the auxiliary frame portions 552 and the main body frame portion 551 are flush with each other. As a result, the second bottom portion 550B is formed. The second bottom portion 550B is fixed to the floor surface S through a plurality of anchor bolts (not shown). Fixation positions with the anchor bolts are not particularly limited. For example, on a plurality of fixation positions on the auxiliary frame portions 552 indicated by symbol P in FIG. 6, the mounting unit 54 is fixed to the floor surface S.

The main body frame portion 551 and the auxiliary frame portions 552 are combined or integrated by bolting or welding the plurality of shaft members, for example. Lengths, cross-sectional shapes, thicknesses, and the like of the shaft members are not particular limited. Designing is performed in such a manner that predetermined rigidity and strength can be obtained so as to stably support the work table 51.

(Connection Frame)

The connection frame 560 is constituted of a plurality of shaft members that connects the first bottom portion 540B and the second bottom portion 550B with each other. The first bottom portion 540B and the second bottom portion 550B are formed on the same plane. The connection frame 560 is constituted of a plurality of shaft members parallel to the plane. In this embodiment, as shown in FIG. 6, the connection frame 560 is constituted of a plurality of shaft members 560x that is extended in the X axis direction, but instead of or in addition to the members, the connection frame 560 may be constituted of a plurality of shaft members that is extended in the Y axis direction.

The plurality of shaft members 560x that constitutes the connection frame 560 may be configured by shaft members independent of each other or may be configured by shaft members common to the shaft members that constitute the first mounting 540 or the second mounting 550. In this embodiment, the shaft members 560x are configured by shaft members common to shaft members 540x that constitute the first bottom portion 540B and are bonded integrally to a shaft member 551y of the main body frame portion 551 that constitutes the second bottom portion 550B by bolting or welding.

The connection frame 560 is provided between the first bottom portion 540B and the second bottom portion 550B. Therefore, between the first upper end portion 540T and the second upper end portion 550T, the plurality of shaft members that constitute the first and second mountings 540 and 550 are intervened. As a result, it is possible to maximize a length of a vibration transmission path from the first upper end portion 540T that supports the first robot 10 to the second upper end portion 550T that supports the work table 51. Thus, vibrations generated in association with rotation, extension or contraction, and the like of the first robot 10 is difficult to be transmitted to the work table 51 on which the work W (reception base R) is placed, and thus it is possible to stably and appropriately perform an assembly working of the work W.

In particular, in this embodiment, the first mounting 540 has a combination structure of first and second base frames 541 and 542, and the second base frame 542 has a width shorter than the first base frame 541. Therefore, an outreach from the first upper end portion 540T as a vibration surface to the connection frame 560 is extended by a distance that the shaft members 540x, 540y are passed through. As a result, it is possible to further improve a vibration transmission prevention function to the work table 51 while increasing the rigidity and strength of the first mounting 540.

Further, according to this embodiment, because the second bottom portion 550B of the second mounting 550 is fixed to the floor surface S with the plurality of anchor bolts, it is possible to generate a connection cutting effect of the vibration transmission path on the fixation position with the floor surface S. In particular, on the first and second mountings 540, 550, immediately below the shaft member (supporting column) that is extended in the Z axis direction, the fixation position with the anchor bolts is set, with the result that the effect can be more significantly obtained. It should be noted that the same effect described above can be obtained by setting the fixation position with the anchor bolts on the connection frame 560.

Further, in the mounting unit 54 in this embodiment, the first mounting 540 and the second mounting 550 are integrated with each other through the connection frame 560, and thus, for example, at a time of starting the device or changing a line layout, it is possible to ensure desired installation accuracy of the mountings 540, 550. As a result, it is possible to increase workability of installing a mounting unit as compared to a case where the two mountings are separated.

[First Robot]

The first robot 10 is disposed on a center of the work base 50 so as to rotatable around the Z axis. Further, the first robot 10 is provided on the first upper end portion 540T of the first mounting 540 so as to be protruded upwards from the opening portion 50a of the work base 50. As a result, the first robot 10 can access all the work areas P1 to P8 on the work base 50 (rotation table unit 53).

Further, as shown in FIG. 5, the first robot 10 includes an articulated arm 11, a hand unit 12 connected to a tip end portion of the articulated arm 11, and a drive unit 13 connected to a base end portion of the articulated arm 11.

The articulated arm 11 is configured by a vertical articulated arm, for example, but is not limited to this. The articulated arm 11 may be configured by another articulated arm such as a horizontal articulated arm (also referred to as SCARA (Selective Compliance Assembly Robot Arm) type), a frog leg type, and a parallel link type.

The drive unit 13 is fixed between the articulated arm 11 and the second base frame 542 of the first mounting 540 and drives the articulated arm 11 and the hand unit 12 on a basis of a control instruction transmitted from the controller 80. The controller 80 controls operations of extension or contraction of the articulated arm 11, pivoting thereof around the Z axis, rotation of the hand unit 12, and the like. Typically, the controller 80 executes a program stored in a memory of the controller, thereby causing the first robot 10 to operate in a predetermined sequence.

[Second Robot]

The second robot 20 is configured to be rotatable around the Z axis and is disposed on a position from which the second robot 20 can access at least one work area out of the plurality of work areas P1 to P8 outside the work base 50.

Further, typically, the second robot 20 can have a similar configuration to the first robot 10, but the configuration is not limited to this. It should be noted that the configuration of the second robot 20 may be changed as appropriate in accordance with a configuration of the assembly apparatus 200.

[Controller]

The operations of the first robot 10 and the second robot 20, a rotation operation of the rotation table unit 53, and the like are controlled by the controller 80. Typically, the controller 80 is configured by a computer. The controller 80 may control an operation of the conveyance line 100. Further, the controller 80 may be configured as a part of the assembly apparatus 200 or may be configured by a control apparatus different from the assembly apparatus 200.

[Others]

As shown in FIG. 1, the assembly apparatus 200 according to this embodiment can include a third robot 30 as a third robot (C), first to third component storage units 40a to 40c, a component support base 70, first to third assistance apparatuses 60a to 60c that assist assembling the work W.

As shown in the figure, the third robot 30 is disposed on a position near the work base 50 and the conveyance line 100 on outside of the work base 50, can convey the work W1 before assembly from the first conveyor 101 to the work base 50, and can convey the work W2 after the assembly from the work base 50 to the second conveyor 102.

As shown in FIG. 1, the first component storage unit 40a is disposed on a position near the work area P4 on the outside of the work base 50. In this embodiment, on the first component storage unit 40a, the component A mounted on the work W is placed.

As shown in FIG. 1, the second and third component storage units 40b and 40c are disposed on positions which the second robot 20 can access on the outside of the work base 50. In this embodiment, on the second component storage unit 40b, the component B is placed, and on the third component storage unit 40c, the component C is placed.

The first to third component storage units 40a to 40c are not particularly limited, and typically, component shelves such as stockers on which components to be mounted on the work W can be placed.

As shown in FIG. 1, the component support base 70 is disposed on a position near the work area P6 on the outside of the work base 50 and is disposed vertically above the third assistance apparatus 60c. In this embodiment, the component support base 70 can support the component B.

Here, the position on which the component support base 70 is disposed is between the first robot 10 and the second component storage unit 40b as shown in the figure and is a relay position on which the component B is indirectly passed from the second robot 20 to the first robot. It should be noted that the component support base 70 according to this embodiment is not particularly limited, but only has to be a support table (placement table) or the like where the component B can be supported.

As shown in FIG. 1, the first assistance apparatus 60a is disposed on a position near the work area P3 on the outside of the work base 50 and can screw the work W to which the component A is assembled.

As shown in FIG. 1, the second assistance apparatus 60b is disposed on a position near the work area P5 on the outside of the work base 50 and can screw the work W to which the component A and the component B are assembled.

As shown in FIG. 1, the third assistance apparatus 60c is disposed on a position near the work area P6 on the outside of the work base 50. In this embodiment, the component A and the component B are mounted on the third assistance apparatus 60c, and the third assistance apparatus 60c is an inverting apparatus that inverts two sides of the screwed work W.

<Operation of Assembly Apparatus>

Figure 7:
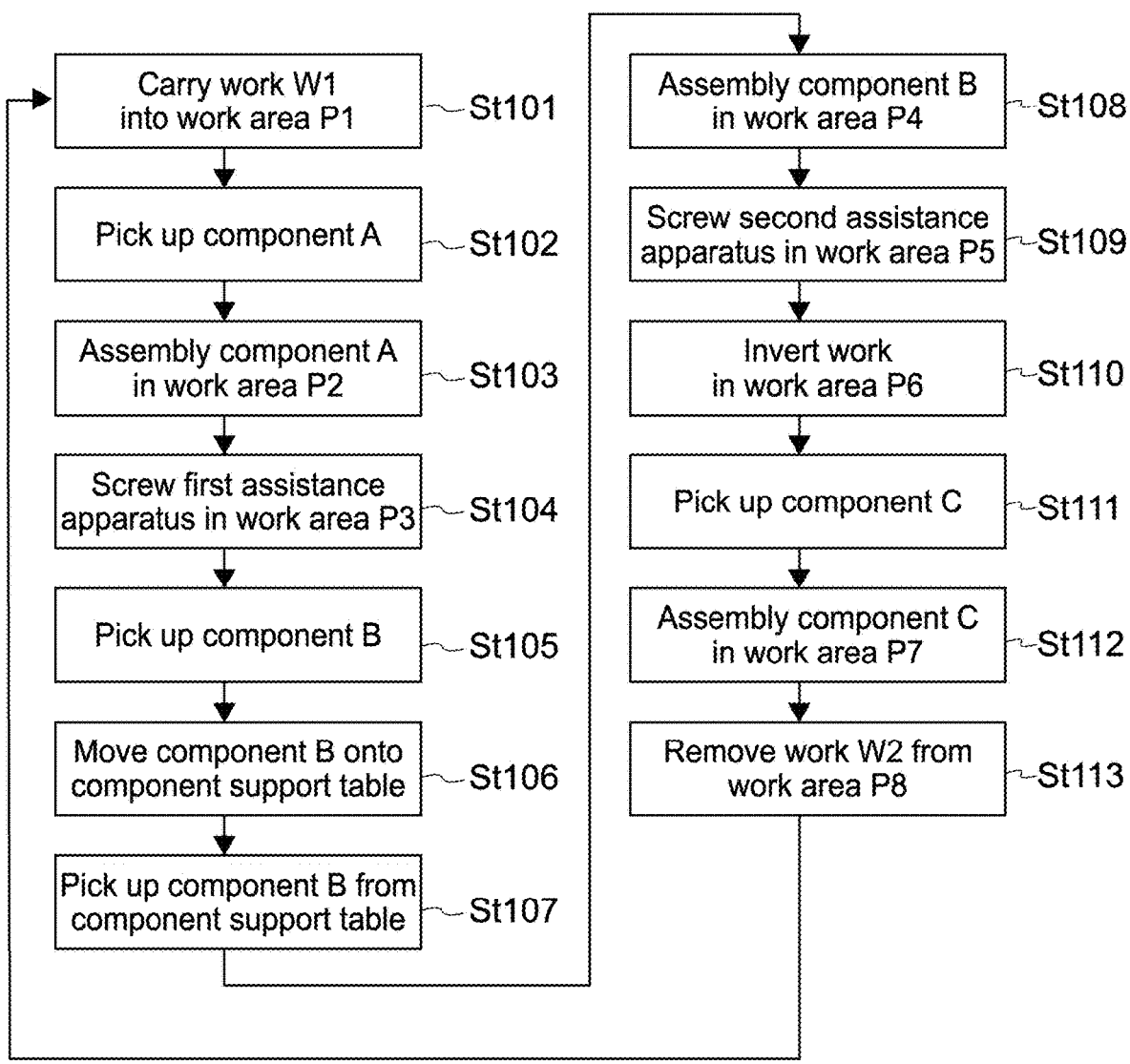
FIG. 7 A flowchart showing steps from carrying to removing of the work by the assembly apparatus.

Subsequently, an operation of the assembly apparatus 200 will be described. FIG. 7 is a flowchart showing a process from carrying of the work W1 to removing of the work W2 by the by the assembly apparatus 200.

While causing the rotation table unit 53 of the work table 51 to rotate at an equiangular pitch every predetermined time, at each rotation position, the assembly apparatus 200 carries the work W1 before assembly, performs assembly working of the work W, and removes the work W2 after assembly. The operation of the assembly apparatus 200 is controlled by the controller 80.

As shown in FIG. 1, the assembly apparatus 200 includes the plurality of work areas P1 to P8. The work area P1 doubles as an area in which the work W1 before assembly is carried. In this embodiment, the third robot 30 carries work W1 before assembly from the conveyance line 100 (first conveyor 101) in the work area P1 (St101). Subsequently, the first robot 10 picks up the component A from the first component storage unit 40a on which the component A is placed in advance (St102). Then, after a certain time (time T1) elapses from when the work W1 is carried in the work area P1, the rotation table unit 53 is rotated clockwise by one pitch (45 degrees), and the work W1 is conveyed to the work area P2.

Subsequently, in the work area P2, the first robot 10 assembles the component A to the work W1 conveyed from the work area P1 (St103). Then, after the certain time (time T1) elapses from when the work W1 is conveyed to the work area P2, the rotation table unit 53 is rotated clockwise by one pitch (45 degrees), and the work W to which the component A is assembled is conveyed from the work area P2 to the work area P3.

Subsequently, in the work area P3, the work W which is conveyed from the work area P2 and to which the component A is assembled is screwed by the first assistance apparatus 60a (St104). Subsequently, the second robot 20 picks up the component B from the second component storage unit 40b on which the component B is placed in advance (St105) and moves the component B onto the (St106). Then, the first robot 10 picks up the component B from the component support base 70 (St107). Then, after the certain time (time T1) elapses from when the work W to which the component A is assembled is conveyed to the work area P3, the rotation table unit 53 is rotated clockwise by one pitch (45 degrees), and the work W is conveyed from the work area P3 to the work area P4.

Subsequently, in the work area P4, the first robot 10 assembles the component B to the work W conveyed from the work area P3 (St108). Then, after the certain time (time T1) elapses from when the work W is conveyed to the work area P4, the rotation table unit 53 is rotated clockwise by one pitch (45 degrees), and the work W to which the component A and the component B are assembled is conveyed from the work area P4 to the work area P5.

Subsequently, in the work area P5, the work W that is conveyed from the work area P4 is screwed by the second assistance apparatus 60b (St109). Then, after the certain time (time T1) elapses from when the work W is conveyed to the work area P3, the rotation table unit 53 is rotated clockwise by one pitch (45 degrees), and the work W to which the component A and the component are assembled and which is screwed is conveyed from the work area P5 to the work area P6.

Subsequently, in the work area P6, the third assistance apparatus 60c inverts two sides of the work W that is conveyed from the work area P5 (St110). Subsequently, the second robot 20 picks up the component C from the third component storage unit 40c on which the component C is placed in advance (St111). Then, after the certain time (time T1) elapses from when the work W is conveyed to the work area P6, the rotation table unit 53 is rotated clockwise by one pitch (45 degrees), with the result that the work W is conveyed to the work area P7 with the two sides thereof inverted.

Subsequently, in the work area P7, the second robot 20 assembles, to the work W that is conveyed from the work area P6, the component C from an opposite side to a side on which the component A and the component B are assembled (St112), thereby assembling the work W2. Then, after the certain time (time T1) elapses from when the work W is conveyed to the work area P7, the rotation table unit 53 is rotated clockwise by one pitch (45 degrees), and the work W2 is conveyed from the work area P7 to the work area P8.

Subsequently, the work W2 that is conveyed to the work area P8 is removed to the conveyance line 100 (second conveyor 102) by the third robot 30 (St113). The work area P8 doubles as an area to which the work W2 after assembly is removed. Then, after the certain time (time T1) elapses from when the work W2 is conveyed to the work area P8, the rotation table unit 53 is rotated clockwise by one pitch (45 degrees), and the third robot 30 carries the work W1 before assembly from the conveyance line 100 (first conveyor 101) into work area P1 again.

Typically, the assembly apparatus 200 repeatedly performs the steps (St101 to St113), with the result that the works W are sequentially conveyed from the work area P1 to the work area P8, and the predetermined assembly working is carried out in each of the work areas.

As described above, the assembly working of assembling the work W2 from the work W1 by the assembly apparatus 200 is performed. The controller 80 controls the drive of the first and second robots 10, 20 and the like of the rotation table unit 53, thereby causing an entire apparatus to operate in a predetermined cycle time.

It should be noted that in the assembly apparatus 200 according to this embodiment, typically, the work W1 carried in the work area P1 is conveyed to the work area P2 subsequent thereto, and then, a new work W1 is carried in the work area P1 in sequence.

Generally, in a case where assembly and conveyance steps for works in a manufacture line of electronic apparatuses or electronic components are shared in a robot apparatus having a plurality of robots, a cycle time of the apparatus depends on a cycle time of assembly working for a work that requires a longest time. Even if a time required for the other workings is short, it is impossible to make the cycle time of the entire apparatus shorter than the longest assembly working cycle time.

In view of the above, the assembly apparatus 200 according to this embodiment solves the problem specifically as follows.

Figure 8:
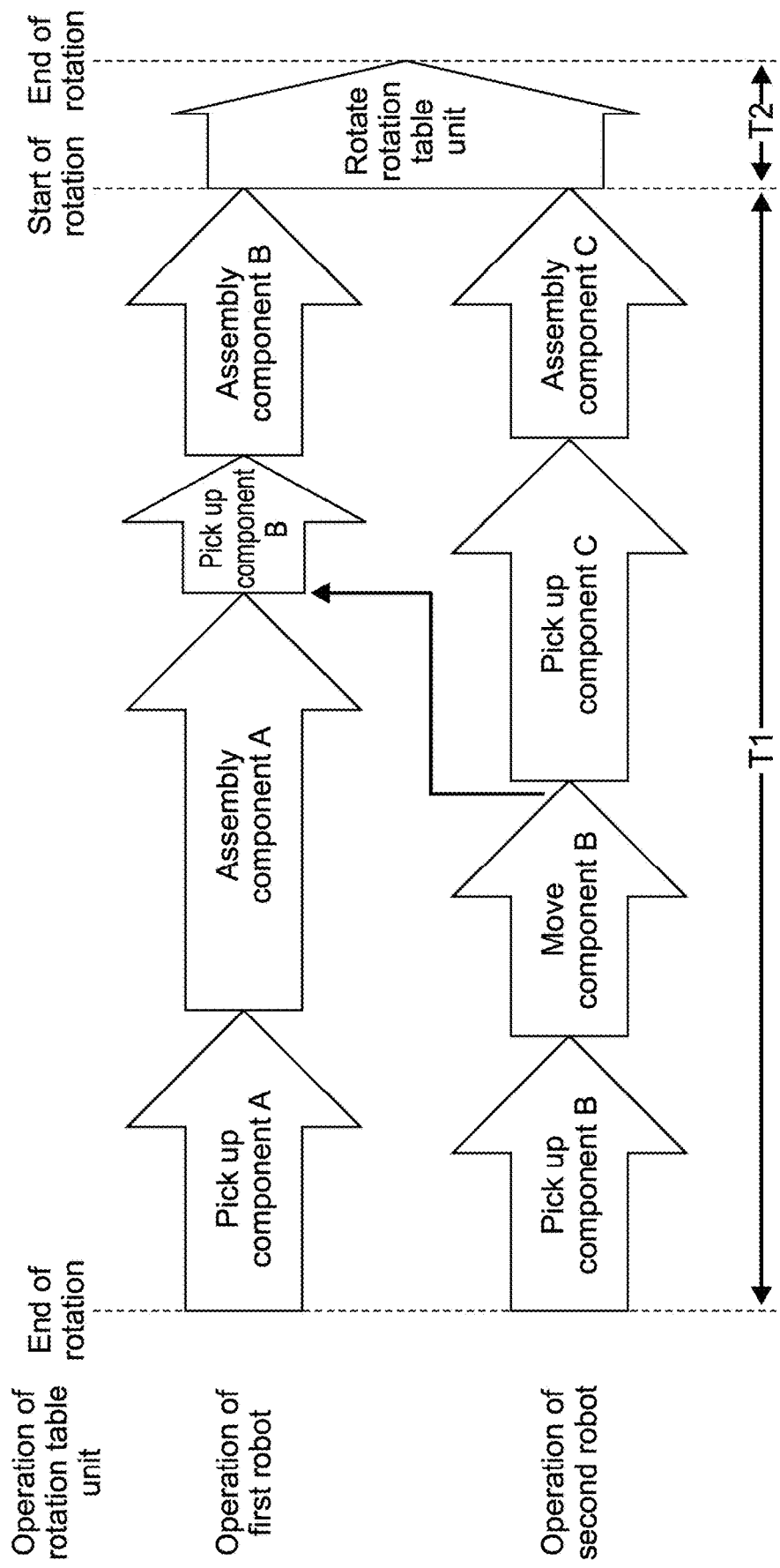
FIG. 8 A diagram showing a temporal flow of sequence operations of a first robot and a second robot of the assembly apparatus.

FIG. 8 is a diagram showing a temporal flow of a sequence operation of the first and second robots 10, 20. In this case, a description will be given by using an example of an operation of the assembly apparatus 200 immediately after the works W are placed on the plurality of work areas P2 to P8 after the rotation table unit 53 is rotated by one pitch.

As shown in FIG. 8, the work W1 before assembly is carried in the work area P1 on the rotation table unit 53. While picking up the component A from the first component storage unit 40a by the first robot 10, the second robot 20 picks up the component B from the second component storage unit 40b.

Then, as shown in FIG. 8, while moving the component B picked up from the second component storage unit 40b by the second robot 20 onto the component support base 70, the first robot 10 assembles the component A to the work W1 on the work area P2.

Then, by the first robot 10, while assembling the component A to the work W1 and picking up the component B moved from the second component storage unit 40b onto the component support base 70 by the second robot 20, the second robot 20 picks up the component C from the third component storage unit 40c.

Subsequently, while assembling the component B picked up from the component support base 70 to the work W in the work area P4 by the first robot 10, the second robot 20 assembles the component C picked up from the third component storage unit 40c to the work W in the work area P7.

As described above, in this embodiment, as shown in FIG. 8, before the rotation table unit 53 is rotated by the predetermined pitch (45 degrees) (during stopping the rotation table unit 53 (time T1)), the first and second robots 10, 20 pickup the components and assemble the work W in parallel.

Further, in this embodiment, during when the first and second robots 10, 20 are driven, within time T1, carrying and removing the work (W1, W2) of the third robot 30, screwing the first and second assistance apparatuses 60a, 60b, and the inverting operation of the third assistance apparatus 60c are performed in parallel with the operation described above. It should be noted that the first to third robots 10 to 30 can be driven during the rotation of the rotation table unit 53 (FIG. 8 (T2)).

Therefore, in this embodiment, the first and second robots 10, 20 and the first to third assistance apparatuses 60a to 60c perform the assembly working for the work W in each operation area in parallel. As a result, the cycle time of the entire apparatus does not depend on the assembly working for the work W which requires the longest time.

That is, by related art, the assembly working for the work W is mainly performed by the first robot 10 that can access all the plurality of work areas, so a significantly long cycle time is required.

In view of this, in the assembly apparatus 200 in this embodiment, the assembly working for the work W which is mainly performed by the first robot 10 ordinarily is assisted by the second robot 20 and the plurality of assistance apparatuses. As a result, the cycle time (time T1) from carrying the work to removing the work is reduced as compared to related art.

Thus, according to this embodiment, it is possible to reduce the cycle time of the assembly apparatus 200, which makes it possible to achieve a further enhancement of productivity in manufacturing electronic apparatuses or electronic components. It should be noted that in this embodiment, the time T1 is set to approximately 40 seconds but is not of course limited to this.

Further, according to this embodiment, the first robot 10 is provided in the opening portion 50a formed on the center of the rotation table unit 53, so the first robot 10 is disposed at the same distance to the work areas P1 to P8. As a result, the first robot 10 can access the plurality of work areas. Thus, it is unnecessary to additionally provide a plurality of robots to assemble the work W, which can make the entire apparatus compact.

Second Embodiment

Subsequently, a second embodiment of an assembly apparatus according to the present technology will be described. Hereinafter, configurations similar to those of the first embodiment will be denoted by the same symbols, and description of those will be omitted or simplified.

An assembly apparatus according to this embodiment includes the work base 50, the first and second robots 10, 20, and a controller. Further, also in this embodiment, the assembly apparatus includes the first to third component storage units 40a to 40c, the first to third assistance apparatuses 60a to 60c, and the component support base 70 as in the first embodiment described above.

The work base 50, the first to second robots 10, 20, the first to third assistance apparatuses 60a to 60c, the first to third component storage units 40a to 40c, and the component support base 70 have configurations similar to those in the first embodiment. On the other hand, the controller in this embodiment perform different control from the controller 80 in the first embodiment in terms of the following points.

That is, in the first embodiment, the controller 80 controls the operation of the second robot 20 and the like so as to assist the assembly working for the work W by the first robot 10. In contrast, the controller in this embodiment controls the operations of the first and second robots 10, 20 in such a manner that the assembly working for the work W is shared on a plurality of work areas.

For example, the controller in this embodiment determines, from an assembly time or the like for the first robot 10 in a predetermined work area, whether the first robot 10 can carry out the assembly working in a plurality of predetermined work areas within a certain time (time T1) or not. When the controller determines that the first robot 10 cannot carry out the assembly working within the certain time, the controller can cause the second robot 20 to perform the assembly working which is to be performed by the first robot 10 in the predetermined work area instead of the first robot 10.

As a result, for example, in a case where the time the first robot 10 takes to perform the assembly working in the predetermined work area (for example, FIG. 7 (St103)) exceeds a target tact time, the controller in this embodiment can cause the second robot 20 to perform subsequent assembly workings (for example, FIG. 7 (St108)) which are to be performed by the first robot 10. Thus, the assembly of the work W can be carried out within the time T1.

Further, according to this embodiment, in the assembly apparatus, the controller performs determination similar to the above by using an operation time or the like of the second robot 20, with the result that the assembly working for the work W can be shared by the first robot 10 and the second robot 20.

For example, in the assembly apparatus in this embodiment, in a case where the time the second robot 20 takes to perform the operation (for example, FIG. 7 (St105 or St106)) exceeds a target tact time, it is also possible to cause the first robot 10 to perform subsequent assembly workings (for example, FIG. 7 (St111 and St112)) which are to be performed by the second robot 20 instead of the second robot 20. As a result, it is possible to carry out the assembly of the work W within the time T1 as in the above.

From the above description, in the assembly apparatus in this embodiment, the assembly working for the work W can be shared by the first and second robots 10, 20. As a result, the cycle time (time T1) from carrying the work W1 to removing the work W2 is within a target cycle time, which suppresses the cycle time of the entire apparatus from being increased. Thus, it is possible to maintain productivity equivalent to the first embodiment described above.

MODIFIED EXAMPLE

In the above, the embodiments of the present technology are described. The present technology is not limited to the above embodiments and can of course be variously changed without departing from the gist of the present technology.

Further, in the above embodiments, the second mounting 550 is disposed so as to surround the first mounting 540, but a layout of the mountings is not particularly limited. The number of mountings is not limited to two. The present technology can be applied to various mounting structures in which three or more mountings are connected through the connection frame.

Further, in addition to the example in which the work W is conveyed by the rotation table unit 53, the work W may be conveyed by the first robot 10 disposed on the center of the work base 50.

Furthermore, in the above embodiments, the assembly apparatus conveys the work W by using a rotation index table along a circumference thereof at the predetermined pitch. Here, in the present technology, the circumference is not limited to a circumference of an exact circle and may be a circumference of a semicircle, an ellipse, an arc, or a circle having a curvature of approximately 0, for example.

Further, in the above embodiments, with respect to the work on each of the plurality of work areas, the single assembly working is performed but is not limited to this. Two or more kinds of assembly workings may be performed.

Further, in the above embodiments, the assembly working of one of the first and second robots 10, 20 can be caused to be performed by the other robot but is not limited to this. The controller according to the present technology may cause a predetermined assembly working by the assistance apparatus to be performed by the first or second robot 10, 20.

It should be noted that the present technology can take the following configurations.

(1) An assembly apparatus, including:

a work base that has a placement surface on which a plurality of works is placed, and causes the plurality of works to individually circulate to a plurality of work areas arranged along a circumference every certain time;

a first robot disposed inside the circumference and capable of accessing the plurality of work areas;

a second robot disposed outside the circumference and capable of accessing at least one work area out of the plurality of work areas; and a controller that causes the first robot to perform a predetermined process within the certain time with respect to works on a plurality of predetermined work areas out of the plurality of work areas, and causes the second robot to perform an operation of assisting the process by the first robot with respect to the work on the at least one work area out of the plurality of predetermined work areas.

(2) The assembly apparatus according to (1) above, further including:

a component storage unit that stores a first component, in which the plurality of predetermined work areas includes a first assembly area in which the first component is assembled to the work, and the controller causes the second robot to perform an operation of conveying the first component from the component storage unit to a relay position set between the first robot and the component storage unit, and causes the first robot to perform an operation of obtaining the first component conveyed to the relay position and assembling the first component to the work in the first assembly area.

(3) The assembly apparatus according to (2) above, further including:

a component support base disposed on the relay position and capable of supporting the first component.

(4) The assembly apparatus according to any one of (1) to (3) above, in which the plurality of predetermined work areas includes a second assembly area in which a second component is assembled to the work, and the controller causes the second robot to perform an operation of assembling the second component to the work in the second assembly area.

(5) The assembly apparatus according to any one of (1) to (4) above, in which the controller determines whether the predetermined process by the first robot with respect to the works on the plurality of predetermined work areas is capable of being carried out within the certain time or not, and when determines that the predetermined process is not capable of being carried out, the controller causes the second robot to perform the predetermined process on behalf of the first robot.

(6) The assembly apparatus according to any one of (1) to (5) above, further including:

an assistance apparatus that is disposed outside the circumference and performs a predetermined process with respect to the work on a work area different from the plurality of predetermined work areas within the certain time.

(7) The assembly apparatus according to any one of (1) to (6) above, in which the work base is composed of a rotation table rotated by a predetermined angle every certain time, and the first robot is disposed on a center portion of the rotation table in non-contact with the rotation table.

(8) The assembly apparatus according to (7) above, further including:

a mounting unit having a first mounting that supports the first robot and a second mounting independent of the first mounting.

(9) An assembly apparatus, including:

a work base that has a placement surface on which a plurality of works is placed, and causes the plurality of works to individually circulate to a plurality of work areas arranged along a circumference every certain time;

a first robot disposed inside the circumference and capable of accessing the plurality of work areas;

a second robot disposed outside the circumference and capable of accessing at least one work area out of the plurality of work areas; and a controller that causes the first robot and the second robot to perform a predetermined process within the certain time with respect to works on a plurality of predetermined work areas out of the plurality of work areas.

(10) A control method for an assembly apparatus, including:

causing a plurality of works to individually circulate to a plurality of work areas arranged along a circumference every certain time;

causing a first robot disposed inside the circumference to perform a predetermined process within the certain time with respect to works on a plurality of predetermined work areas out of the plurality of work areas; and causing a second robot disposed outside the circumference to perform an operation of assisting the process by the first robot with respect to the work on at least one work area out of the plurality of predetermined work areas.

REFERENCE SIGNS LIST 1 production system
10 first robot
20 second robot
30 third robot
40a first component storage unit
40b second component storage unit
40c third component storage unit
50 work base
53 rotation table unit
54 mounting unit
60a first assistance apparatus
60b second assistance apparatus
60c third assistance apparatus
70 component support base
80 controller
100 conveyance line
200 assembly apparatus

The invention claimed is:

1. An assembly apparatus, comprising:
a work base that has a placement surface on which a plurality of works is placed, and causes the plurality of works to individually circulate to a plurality of work areas arranged along a circumference every certain time;
a first robot disposed inside the circumference and capable of accessing the plurality of work areas;
a second robot disposed outside the circumference and capable of accessing at least one work area out of the plurality of work areas; and
a controller that is configured to cause the first robot to perform a first assembly process within the certain time with respect to works on a plurality of predetermined work areas out of the plurality of work areas, and is configured to cause the second robot to perform a second assembly process of assisting the first assembly process by the first robot with respect to the work on the at least one work area out of the plurality of predetermined work areas, the first and second assembly processes being performed in parallel.

2. The assembly apparatus according to claim 1, further comprising:
a component storage unit that stores a first component, wherein
the plurality of predetermined work areas includes a first assembly area in which the first component is assembled to the work, and the controller causes the second robot to perform an operation of conveying the first component from the component storage unit to a relay position set between the first robot and the component storage unit, and causes the first robot to perform an operation of obtaining the first component conveyed to the relay position and assembling the first component to the work in the first assembly area.

3. The assembly apparatus according to claim 2, further comprising:
a component support base disposed on the relay position and capable of supporting the first component.

4. The assembly apparatus according to claim 1, wherein
the plurality of predetermined work areas includes a second assembly area in which a second component is assembled to the work, and
the controller causes the second robot to perform an operation of assembling the second component to the work in the second assembly area.

5. The assembly apparatus according to claim 1, wherein
the controller determines whether the predetermined process by the first robot with respect to the works on the plurality of predetermined work areas is capable of being carried out within the certain time or not, and when determines that the predetermined process is not capable of being carried out, the controller causes the second robot to perform the predetermined process on behalf of the first robot.

6. The assembly apparatus according to claim 1, further comprising:
an assistance apparatus that is disposed outside the circumference and performs a predetermined process with respect to the work on a work area different from the plurality of predetermined work areas within the certain time.

7. The assembly apparatus according to claim 1, wherein
the work base is composed of a rotation table rotated by a predetermined angle every certain time, and
the first robot is disposed on a center portion of the rotation table in non-contact with the rotation table.

8. The assembly apparatus according to claim 7, further comprising:
a mounting unit having a first mounting that supports the first robot and a second mounting independent of the first mounting.

9. An assembly apparatus, comprising:
a work base that has a placement surface on which a plurality of works is placed, and causes the plurality of works to individually circulate to a plurality of work areas arranged along a circumference every certain time;
a first robot disposed inside the circumference and capable of accessing the plurality of work areas;
a second robot disposed outside the circumference and capable of accessing at least one work area out of the plurality of work areas; and
a controller that is configured to cause the first robot and the second robot to perform first and second assembly processes, respectively, in parallel within the certain time with respect to works on a plurality of predetermined work areas out of the plurality of work areas.

10. A control method for an assembly apparatus, comprising:
causing a plurality of works to individually circulate to a plurality of work areas arranged along a circumference every certain time;

causing a first robot disposed inside the circumference to perform a first assembly process within the certain time with respect to works on a plurality of predetermined work areas out of the plurality of work areas; and causing a second robot disposed outside the circumference to perform a second assembly process of assisting the first assembly process by the first robot with respect to the work on at least one work area out of the plurality of predetermined work areas, the first and second assembly processes being performed in parallel.

* * * * *